United States Patent [19]

Scott et al.

[11] 4,239,669

[45] Dec. 16, 1980

[54] AQUEOUS EMULSION POLYMERIZATION OF VINYL MONOMERS USING MIXTURES OF EMULSIFIERS

[75] Inventors: Charles M. Scott, Fair Oak; Alan A. J. Feast, Chandlers Ford, both of England

[73] Assignee: I.S.R. Holding SARL, Luxembourg

[21] Appl. No.: 971,095

[22] Filed: Dec. 19, 1978

[30] Foreign Application Priority Data

Dec. 19, 1977 [GB] United Kingdom ............... 52725/77

[51] Int. Cl.$^3$ ........................ C08F 12/08; C08L 25/04
[52] U.S. Cl. ........................ 260/29.6 R; 260/29.6 RB; 260/29.7 R; 260/29.7 VA; 526/64; 526/89; 526/216; 526/225; 526/340; 526/342; 526/346
[58] Field of Search ............... 260/29.6 R, 29.7 R; 526/64, 89, 216, 225; 525/52

[56] References Cited

U.S. PATENT DOCUMENTS

| | | | |
|---|---|---|---|
| 2,631,142 | 3/1953 | Williams | 526/216 |
| 3,651,037 | 3/1972 | Snow | 526/216 |
| 3,651,038 | 3/1972 | Snow | 526/216 |

*Primary Examiner*—Harry Wong, Jr.
*Attorney, Agent, or Firm*—Cushman, Darby & Cushman

[57] ABSTRACT

An emulsion polymerization process comprises subjecting an intimate aqueous dispersion of monomer material comprising at least one vinyl aromatic monomer, optionally with unsaturated nitrile or conjugated diene comonomer to a rapid polymerization, preferably adiabatic, in the presence of a particular emulsifier system in a continuous flow agitated reaction carried out at 80° C. to 100° C. The thermoplastic product in latex form is continuously removed and is ideal for use in reinforcing rubber latices. An advantage is that a small reactor may be used to obtain a large throughput.

13 Claims, No Drawings

AQUEOUS EMULSION POLYMERIZATION OF VINYL MONOMERS USING MIXTURES OF EMULSIFIERS

This invention relates to the polymerisation of at least one vinyl monomer in emulsion to obtain a thermoplastic product. In a particular embodiment it relates to the polymerisation of a vinyl aromatic monomer, especially styrene, to obtain a thermoplastic polymer in latex form which is particularly useful as a reinforcing agent for rubber latices.

It is well known to polymerise vinyl monomers in emulsion. Thus styrene-butadiene rubbers are prepared commercially in emulsion on a large scale. Thermoplastics such as acrylonitrile-butadiene-styrene (ABS) resin and polystyrene and styrene-acrylonitrile copolymer may also be prepared in emulsion.

Thermoplastic polymers and copolymers of a vinyl aromatic monomer, in latex form, have been used for many years as reinforcing agents for moulded and spread foams based on rubber latex. The latex may be compounded with the rubber latex, or if desired may be coagglomerated with the rubber latex using, for example, the process disclosed in British patent specification No. 976,213. For optimum reinforcement we believe that the number average particle size of the vinyl aromatic polymer in the latex should be in the range 1000 to 1500 Angstroms. Previously such vinyl aromatic polymer latices have been prepared by a batch reaction.

We now find that a vinyl aromatic monomer may be polymerised or copolymerised in emulsion to a thermoplastic product having polymer particles in the above-mentioned size range in a fast reaction carried out under continuous flow conditions by adjustment and control of the reaction conditions used.

According to the present invention an emulsion polymerisation process comprises (1) subjecting an initmate aqueous dispersion of monomer material comprising (A) at least one vinyl aromatic monomer, (B) a mixture of one of at least one vinyl aromatic monomer with at least one unsaturated nitrile or (C) a mixture of at least one vinyl aromatic monomer with at least one conjugated diene, the ratio of monomers in mixtures (B) and (C) being such as to yield a thermoplastic product, with 1.0 to 2.0 parts per hundred parts of monomer (phm) on a weight basis of primary emulsifier, 1.0 to 2.0 phm of secondary emulsifier and free radical initiator, to a rapid polymerisation, preferably under substantially adiabatic conditions, in a continuous flow agitated reaction such that the reaction is carried out at 80° C. to 100° C., and (2) continuously removing the formed latex.

By the use of this process it is possible to obtain a thermoplastic vinyl polymer latex particularly useful as a reinforcing agent for rubber latices in a very short reaction time (less than 1 hour).

The process is particularly applicable to the preparation of thermoplastic polymers from styrene monomer alone or monomer mixtures comprising styrene and acrylonitrile or styrene and butadiene in appropriate ratios.

Examples of vinyl aromatic monomers, other than styrene, which may be used in the process are monovinyl aromatic monomers having one or more alkyl or halo substituents attached to the nucleus. Examples of such compounds are the ar-methyl styrenes, ar-ethyl styrenes, 2,4 dimethyl styrene, isopropyl styrene, t-butyl styrene, o-,m-and p-chlorostyrenes and 2,4 dibromostyrene. Alpha substituted vinyl aromatic monomers, such as alpha methyl styrene and alpha ethyl styrene may be used in copolymerisations but preferably are only employed in admixture with 80% or more of an unsubstituted or nuclear substituted vinyl aromatic monomer.

Examples of unsaturated nitriles which may be copolymerised with the vinyl aromatic monomer(s) in the process of the invention are acrylonitrile and methacrylonitrile. Normally the amount of unsaturated nitrile used will not exceed 30% by weight. Examples of conjugated dienes which may be copolymerised with the vinyl aromatic monomer(s) in the process of the invention are those having up to 10 carbon atoms, such as butadiene, which is preferred, or isoprene. Normally the amount of conjugated diene used will not exceed about 40 mole %, thus yielding the so-called "high styrene" resins.

In the polymerisation of these vinyl monomers by the process of the present invention it is important to have an intimate aqueous dispersion of the monomers, the emulsifiers and the free radical initiator. Preferably this is obtained by passing the aqueous mixture of reactants (other than initiator) through a homogeniser in the supply line to the reaction zone (reactor). Alternatively a homogeniser in a recirculatory loop may be used in which reactants are extracted from the reaction zone, homogenised and then returned to the reactor, but this is less preferred. In either case the reaction is carried out with good agitation to maintain the intimate dispersion stable with no phase separation during reaction.

The primary emulsifier used in the process is preferably the sodium or potassium salt of an organic carboxylic acid having 12 to 20 carbon atoms or of rosin acid. Especially suitable salts are salts of unsaturated fatty acids having 16 to 20 carbon atoms and in particular the sodium and potassium salts of saturated or lunsaturated fatty acids having 16 or 18 carbon atoms. A mixture of two or more salts may be used if desired. Potassium oleate is preferred. If desired it may be prepared in situ using oleic acid and, for example, potassium hydroxide and/or carbonate. Examples of suitable secondary emulsifiers are the alkali metal salts of naphthalene sulphonic acid derivatives such as the sodium salt of naphthalene sulphonic acid-formaldehyde condensate. Examples of such secondary emulsifiers are those available commercially under the trade names Dispersol, Bevaloid and Daxad. Preferably the ratio by weight of primary emulsifier to secondary emulsifier is approximately 1.5:1.0 to 1.0:1.5, preferably they are used in approximately equal amounts.

The free radical initiator which is employed in the process of the invention may be any of those known in the art which produce free radicals under the conditions of reaction. Preferably the free radical initiator is thermally decomposable, i.e., which produces free radicals by thermal decomposition. Preferred initiators in this class are the sodium, potassium and ammonium peroxydisulphates (persulphates). Other examples of initiators in this class are t-butyl hydroperoxide, t-butyl peroctoate, benzoyl peroxide and dicumyl peroxide. Redox initiators may be used if desired. The amount of free radical initiator used in generally in the range of 0.1 to 0.40 phm. 0.1 to 0.30 phm of potassium or ammonium persulphate is very effective.

In common with known emulsion polymerisation techniques, it is desirable to include a molecular weight modifier such as a mercaptan, for example, t-dodecyl mercaptan, or n-dodecyl mercaptan in the reaction mixture, the amount of such modifier generally being from 0.03 to 0.50 phm.

It is also desirable to include an oxygen scavenger, such as sodium dithionite (sodium hydrosulphite), in amounts of, for example, 0.02 phm, since the presence of oxygen has an inhibiting effect on the polymerisation reaction.

The process is carried out in a stirred reactor which, in the polymerisation of a vinyl aromatic monomer or mixture of such monomers, alone does not need to be pressure rated. Where a diene or unsaturated nitrile is used in admixture with the vinyl aromatic monomer(s) it is desirable that the reactor be pressure rated to withstand the pressures generated during the polymerisation which in general will not exceed 20 Atmospheres (0.203 MPa). External pressure need not be applied to the reactor. The reactor size may be quite small, for example, 800 or 1000 gallon capacity. As the residence time is short, a small reactor may be used to obtain a large throughput.

As mentioned above the intimate aqueous dispersion of the monomers the emulsifiers and the free radical initiator is preferably prepared by passing the aqueous mixture of reactants (other than initiator) through a homogeniser in the supply line to the reactor. The temperature of the reactants at this stage may be in the region of 20° C. to 60° C. Generally heat must be supplied to the reactor on start up but once the reaction is proceeding, the exotherm from the heat of polymerisation is easily sufficient to keep the temperature above 80° C. In practice the heat of polymerisation evolved would be sufficient to raise the temperature of the reaction above 100° C. The reaction temperature is however kept within the range 80° C. to 100° C., preferably about 90° C., by reducing the feed temperature of reactants to the reactor or by increasing the amount of water in the aqueous dispersion. Because of the high temperatures employed the polymerisation reaction proceeds very rapidly and it is possible to obtain a conversion of 75% to 85% with a residence time of less than an hour, generally less than 30 minutes.

The pH during reaction is preferably maintained above 10 in order to minimise or eliminate the possibility of coagulum formation. This may be achieved, for example, by using an excess amount of potassium hydroxide in the situ formation of the primary emulsifier.

The latices of vinyl aromatic polymers and copolymers obtained by the process of the invention are particularly useful as reinforcing agents for moulded and spread foam and if desired may be used to reinforce rubber latices, for example SBR rubber latex, by the process disclosed in British patent specification No. 976,213. They may also be used in blends with other latices as stiffening agents in the preparation of latex compositions for use in paper and textile applications.

In a preferred embodiment of the process it is possible to obtain very high conversions so that the need for stripping of unreacted monomers is minimised or even eliminated completely, with consequent energy saving and other economic advantages. In this embodiment the formed latex which is continuously removed is supplied to a finishing vessel where, by the addition of a secondary catalyst, reaction may be taken to substantial completion. In this way residual monomer levels of at most 0.1% may be obtained.

The following Example illustrates the invention:-

EXAMPLE

A polystyrene latex was prepared by the process of the invention employing continuous flow and a fast reaction time.

An aqueous dispersion was prepared to the following formulation in which parts are parts by weight dry:

| | | |
|---|---|---|
| Styrene | 100.00 | Parts |
| Oleic Acid | 1.80 | " |
| Potassium carbonate | 0.24 | " |
| BEVALOID* solution (40%) | 2.04 | " |
| Potassium hydroxide (50%) | 0.53 | |
| Sodium hydrosulphite | 0.024 | " |
| Chelating agent (50%) | 0.06 | " |
| Water | 42.28 | " |
| t-dodecyl mercaptan | 0.30 | " |

*BEVALOID (Trade Mark) is the sodium salt of a naphthalene-sulphonic acid-formaldehyde condensate.

This dispersion together with water (108 phm) was passed through a homogeniser, admixed with a solution of ammonium persulphate (0.12 phm) in water (2.29 phm) and continuously supplied at a temperature of about 50° C. to 60° C. to a stirred tank reactor of 500 imperial gallons capacity. After initiation, the temperature of the reaction mixture rose rapidly and was controlled to a temperature of about 90° C. to 95° C. by cooling the aqueous dispersion supplied to the reactor. After a residence time of 20 minutes to half an hour, reaction mixture was continuously withdrawn from the reactor. Once a steady state had been achieved it was found that the conversion of monomer to polymer latex was about 80%.

Polymer latex was continuously withdrawn and supplied to a large finishing vessel or unstirred tank, together with a secondary catalyst comprising diethylene triamine (0.12 phm), water (1.08 phm) and cumene hydroperoxide (0.16 phm). After several hours it was found that the conversion of monomer to polymer in samples of withdrawn latex achieved substantial completion with a residual monomer content of about 0.1%.

What we claim is:

1. An emulsion polymerisation process which comprises (1) subjecting an intimate aqueous dispersion of monomer material comprising (A) at least one vinyl aromatic monomer selected from the group consisting of styrene, ar-alkyl styrene, halo-styrene, alpha methyl styrene and alpha ethyl styrene as the only monomer; (B) a mixture of at least one vinyl aromatic monomer selected from the group consisting of styrene, ar-alkyl styrene, halo-styrene, alpha methyl styrene and alpha ethyl styrene with not to exceed 30% by weight of at least one unsaturated nitrile or (C) a mixture of at least one vinyl aromatic monomer selected from the group consisting of styrene, ar-alkyl styrene, halo-styrene, alpha methyl styrene and alpha ethyl styrene with not to exceed about 40 mole % of at least one conjugated diene, the ratio of monomers in mixtures of (B) or (C) being such as to yield a thermoplastic product, with 1.0 to 2.0 parts per hundred parts of monomer on a weight basis of primary emulsifier which is the sodium or potassium salt of an organic carboxylic and having 12 to 20 carbon atoms or of rosin acid, 1.0 to 2.0 parts per hundred parts of monomer of secondary emulsifier and which is an alkali metal salt of a naphthalene sulphonic acid-formaldehyde condensate and free radical initiator to a rapid polymerisation in a continuous flow agitated reaction such that the reaction is carried out at 80° C. to 100° C. and (2) continuously removing the formed latex.

2. A process according to claim 1 carried out under substantially adiabatic conditions.

3. A process according to claim 1 wherein the secondary emulsifier is a sodium salt of a naphthalene sulphonic acid formaldehyde condensate.

4. A process according to claim 1 wherein the ratio by weight of primary emulsifier to secondary emulsifier is 1.5:1 to 1:1.5.

5. A process according to claim 1 wherein the primary emulsifier and secondary emulsifier are used in approximately equal amounts.

6. A process according to claim 1 wherein the intimate aqueous dispersion is prepared by passing the monomer material and the emulsifiers through a homogeniser in the supply line to the reactiion or in a recirculatory loop.

7. A process according to claim 1 wherein the reaction residence time is on average less than thirty minutes.

8. A process according to claim 1 wherein the reaction temperature is maintained within the range 80° C. to 100° C. by reducing the temperature of the aqueous dispersion supplied to the reaction or by increasing the amount of water in the aqueous dispersion.

9. A process according to claim 1 wherein the vinyl aromatic monomer in each of (A), (B), and (C) is styrene, ar-methyl styrene, ar-ethyl styrene, 2,4-dimethyl styrene, isopropyl styrene, t-butyl styrene, o-chlorostyrene, p-chlorostyrene, m-chlorostyrene, 2,4-dibromostyrene, alpha methyl styrene or alpha ethyl styrene.

10. A process according to claim 1 wherein the vinyl aromatic monomer in each of (A), (B) and (C) is styrene.

11. A process according to claim 1 wherein the unsaturated nitrile is acrylonitrile or methacrylonitrile and the conjugated diene is butadiene or isoprene.

12. A process according to claim 1 wherein the monomer component is (A), the vinyl aromatic monomer is styrene and there is produced a latex of polystyrene homopolymer.

13. A process according to claim 1 wherein the emulsifier combination consists essentially of the sodium or potassium salt of an organic carboxylic acid having 12 to 20 carbon atoms and an alkali metal salt of a naphthalene sulphonic acid-formaldehyde condensates.

* * * * *